United States Patent
Huhnen (10) Patent No.: US 6,269,834 B1
(45) Date of Patent: Aug. 7, 2001

(54) ELECTROMAGNETICALLY OPERATED DISTRIBUTION VALVE FOR A PNEUMATIC SYSTEM

(75) Inventor: Gerald Huhnen, Backnang (DE)

(73) Assignee: Knorr-Bremse, Munich (DE)

( * ) Notice: Subject to any disclaimer, the term of this patent is extended or adjusted under 35 U.S.C. 154(b) by 0 days.

(21) Appl. No.: 09/043,177

(22) PCT Filed: Jul. 12, 1996

(86) PCT No.: PCT/DE96/01262

§ 371 Date: Mar. 16, 1998

§ 102(e) Date: Mar. 16, 1998

(87) PCT Pub. No.: WO97/10459

PCT Pub. Date: Mar. 20, 1997

(30) Foreign Application Priority Data

Sep. 15, 1995 (DE) ............................................. 195 34 285

(51) Int. Cl.⁷ .................... F16K 27/02; F16K 11/044; F15B 13/00
(52) U.S. Cl. ............... 137/269; 137/596.17; 137/625.65; 137/884; 251/129.16
(58) Field of Search ............................... 137/596.17, 884, 137/269, 625.65; 251/129.16

(56) References Cited

U.S. PATENT DOCUMENTS

| 4,230,156 | * | 10/1980 | Frantz | ................................. 137/625.5 |
| 4,524,797 | * | 6/1985 | Lunga | ........................... 137/625.65 X |
| 4,524,807 | * | 6/1985 | Toliusis | .............................. 137/269 X |
| 4,848,727 | * | 7/1989 | Nanbu et al. | ................ 137/625.65 X |
| 4,898,203 | * | 2/1990 | Kobelt | .................................... 137/269 |
| 5,178,191 | * | 1/1993 | Scheafer | ............................ 137/269 X |

FOREIGN PATENT DOCUMENTS

2588935  *  4/1987  (FR) .

* cited by examiner

Primary Examiner—Stephen M. Hepperle
Assistant Examiner—John Bastianelli
(74) Attorney, Agent, or Firm—Ronald E. Greigg; Edwin E. Greigg (57) ABSTRACT

An electromagnetically actuatable pneumatic directional control valve having a compressed air network connection, a vent and at least one working connection for a compressed air consuming unit. In order to achieve a modular building-block system with a simpler, more efficient assembly and combination of a number of valves into an integral valve block, a working conduit that leads to the working connection, ventilation conduits and a supply conduit that leads to the vent and the compressed air network connection, the vent, and a valve member that has an actuation magnet and controls the conduits are combined in a valve housing. The connections for the compressed air network and the compressed air consuming unit are disposed in a connecting plate that can be separated from the valve housing. The compressed air network connection is comprised of a connection fitting on the one plate side and a connecting bore connected to it on the remote plate side of the connecting plate so that the connecting fitting and connecting bore of connecting plates of two directional control valves disposed next to each other can be plugged into each other and can be connected to each other via connecting means disposed on these plate sides.

14 Claims, 10 Drawing Sheets

ELECTROMAGNETICALLY OPERATED DISTRIBUTION VALVE FOR A PNEUMATIC SYSTEM

PRIOR ART

The invention is based on an electromagnetically actuatable pneumatic directional control valve.

Directional control valves of this kind are used in utility vehicles for actuating pneumatic auxiliary units, such as differential locks, actuation of the engine brake, transmission control, luggage compartment flap actuation in busses, etc. from the driver's cab. The directional control valves are most often combined into a so-called valve block which is connected to a compressed air supply line. The number of valves in a valve block is determined by the number of pneumatic auxiliary units to be connected.

The directional control valves are embodied as both electromagnetically, directly actuated valves and electromagnetically pilot-controlled valves. In the latter, a pneumatically actuated main valve is switched by an electromagnetically actuated pilot-control valve. It is standard to use both types of valve in the same vehicle.

In a known directional control valve of the type mentioned at the beginning (U.S. Pat. No. 4,524,797), the supply conduit leading to the compressed air network connection and the ventilation conduit leading to the vent are disposed flush with each other in a valve housing and at right angles to the working conduit leading from the working connection. The magnet coil of the electromagnet rests coaxially on a cylindrical housing part of the valve housing, which housing part contains the supply conduit. The cylindrical armature of the electromagnet is guided so that it can move axially on the inside of the housing and constitutes the valve member, which rests alternatingly on one of the two valve seats, which are embodied at the conduit mouths of the supply conduit and the ventilation conduit. Depending on the position of the valve member, the working conduit is connected to the ventilation conduit or the supply conduit. For the purpose of fastening the directional control valve to a carrier plate in the motor vehicle, pins protrude from the valve housing, which extend at right angles to the supply conduit. When combining a number of valves into a valve block, the valves are attached to the carrier plate next to one another in a parallel alignment of the supply conduits and the compressed air network connections of the individual valves are connected to one another by means of individual plug adapters. The plug adapters are plugged into one another and are respectively slid onto the compressed air network connection on the valve housing. The first plug adapter carries a connection fitting for the compressed air supply line; the last plug adapter is closed off at the end by means of a stopper.

ADVANTAGES OF THE INVENTION

The directional control valve according to the invention, has the advantage that by means of the division into the valve housing and the connecting plate with the corresponding arrangement of the connection fittings and connecting conduits as well as the embodiment of the connecting means on the connecting plate, not only is a modular building-block system achieved for constituting the two necessary types of valves out of largely equivalent elements, but it is also possible to combine the valves into a valve block in an essentially simpler and more efficient manner. The connecting plates of a number of valves connected to the valve housing are simply placed against one another, wherein the connection fitting of the compressed air network connection of the one valve is plugged into the connecting bore of the compressed air connection of the neighboring valve, and they are then connected to each other with positive engagement via the connecting elements. The assembly process takes place without tools in an extremely short time. Separate connecting means, such as the plug adapters in the known directional control valve are no longer necessary. Tolerance problems do not occur due to the radially sealing O-rings between the connection fitting and connecting bore. The O-rings are pre-installed and lie protected in the connecting bores of the compressed air network connection. The disassembly of the valve block is carried out by means of a flat object, with the aid of which the connecting means are released, which are preferably embodied as detent mechanisms. As a result of the extremely low assembly and disassembly time, a considerable cost reduction is produced both in manufacturing and in servicing procedures.

The modular building-block system that can be constituted with the directional control valve according to the invention includes a uniform valve housing and two different embodiments of connecting plates as well as a closure element for closing the connecting bores of the compressed air network connection. The two connecting plate variants are embodied identically on the outside, i.e. they have the same connection fittings and connection bores of the compressed air network connection as well as the same connection means. Only the inside of the connecting plate is changed in so far as a purely conduit device is integrated into the connecting plate for directly connected valves, and in addition to the conduit embodiment, a pneumatically actuated seat valve is integrated into the connecting plate for pilot-controlled valves. As a result of the thus far equivalent embodiment of the connecting plates, different valve types can be combined into one valve block as needed without causing problems.

Advantageous embodiments and improvements of the electromagnetically actuatable directional control valve are possible by means of the measures taken in the remaining claims.

According to a preferred embodiment of the invention, a stepped plug-in fitting with two coaxial fitting sections of different diameters is embodied on the bottom of the valve housing and a stepped plug-in bore with two coaxial bore sections of different diameters is embodied on the top of the connecting plate. The plug-in fitting can be plugged into the plug-in bore in a sealed fashion with the interposition of a radially sealing O-ring between each fitting and bore section. The supply conduit feeds into the circular end face of the smaller diameter fitting section and the working conduit feeds into the annular end face of the larger diameter fitting section. The smaller diameter bore section of the plug-in bore is connected to a connecting conduit which joins the connection fitting to the connecting bore of the compressed air network connection in the connecting plate. The connecting plate is embodied for a directional control valve that is directly actuated by the electromagnet, so that the larger diameter bore section of the plug-in bore communicates with the working connection and is embodied for a pneumatically actuated valve that is pilot-controlled by the electromagnet, so that the larger diameter bore section of the plug-in bore feeds into a connecting conduit which can communicate via a control conduit with a work chamber of a seat valve, which chamber is defined by an advancing piston. Via a valve tappet, the advancing piston actuates a valve plate which opens or closes a valve opening. The valve opening joins the working connection on the connecting plate to the connecting conduit between the connection fitting and the connecting bore of the compressed air network connection in the connecting plate.

According to a preferred embodiment of the invention, the housing and the connecting plate can be connected to each other in detent fashion, for which purpose detent openings are provided, along with detent projections that can snap into them. The detent projections are preferably disposed protruding radially on the circumference of the valve housing and the detent openings are disposed on the connecting plate. By means of this detent connection, it is very simple to mount the individual valve, wherein there are no tolerance problems thanks to the radially sealing O-rings between the plug-in fitting of the valve housing and the plug-in bore in the connecting plate. The O-rings are preinstalled in a protected fashion and do not require any special handling during valve assembly.

According to an advantageous embodiment of the invention, in order to close the connecting bore of the compressed air network connection in the connecting plate, a closing element is provided, which carries connecting elements on one side of the closing element, which correspond to the connecting means that are for producing a connection and are disposed on the plate side of the connecting plate that carries the connecting bore. The closing element carries an axially protruding pin which projects into the connecting bore and seals it in an airtight fashion by means of a sealing ring. When the valve according to the invention is used as a single valve, each valve requires a closing element of this kind, which closes the connecting bore of the compressed air network connection. When a number of individual valves are combined into a valve block, the closing element is merely affixed to the connecting plate of the last valve. The closing element is easy to produce as an injection molded part and in turn can be installed without tools. Installation and removal take place in the same manner as with the connecting plates in relation to one another.

According to an advantageous embodiment of the invention, attaching means for the spatial fixing of the connecting plate are provided on a plate side of the connecting plate that extends between the two plate sides that carry the connection fitting or the connecting bore. These fastening means preferably include a fastening plate formed onto the connecting plate and of one piece with it, with two fastening eyes disposed on it. By means of screws inserted through the fastening eyes, each valve can be individually fastened to the vehicle frame or to a carrier plate held on the vehicle frame. Only short screws are required for fastening, which saves installation time, material costs, and weight.

For the electrical contacting of the electromagnet, according to another embodiment of the invention, the electrical connections of the magnet coil of the electro-magnet are routed to a two-pole plug that can be accessed on the valve housing from the outside and that has two plug pins that are each connected to a winding end of the magnet coil. The plug is covered by a plug cap that carries two plug sleeves that can be slid onto the plug pins. For use in valve blocks, a number of plug caps are connected to an electric bus which is realized by means of an extrusion coated stamped grating. The bus has a number of strip conductors whose number is one greater than the number of plug caps. Each of the two plug sleeves of a plug cap is connected to a strip conductor that is shared by all of the plug caps and the other plug sleeve is connected to a separate strip conductor. All of the strip conductors are routed on the end to a separate electrical contact of an electrical connecting plug. For a bus that is for supplying current to three valves in a valve block, preferably a connecting plug according to DIN 72 585 is used, which has four electrical contacts which are connected to the four strip conductors of the bus in the manner described. The plug caps are radially sealed at the bus and the plugs are radially sealed at the valve housings of the valves that are combined into the valve block.

BRIEF DESCRIPTION OF THE DRAWINGS

The invention will be explained in detail in the description below in conjunction with exemplary embodiments represented in the drawings.

DESCRIPTION OF THE EXEMPLARY EMBODIMENTS

The electromagnetically actuated pneumatic directional control valve 10 shown in different views and sectional representations in FIGS. 1–5 is embodied as a 3/2-way solenoid valve, which in a known manner, has a compressed air network connection 11, a vent 12, and a working connection 13 for a compressed air consuming unit. The circuit symbol for this 3/2-way solenoid valve is shown on the right in FIG. 13. As depicted there, in the unexcited starting position of the valve, the working connection 13 is connected to the vent 12 and closed off in relation to the compressed air network connection 11, and in the excited operating position of the valve, this working connection 13 is connected to the compressed air network connection 11 and is closed off in relation to the vent 12. To this end, as can be seen from the sectional representations in FIGS. 4 and 5, a supply conduit 15 that leads to the compressed air network connection 11, a ventilation conduit 16 that leads to the vent 12, and a working conduit 17 that leads to the working connection 13 feed in a valve chamber 14.

Figure 4:
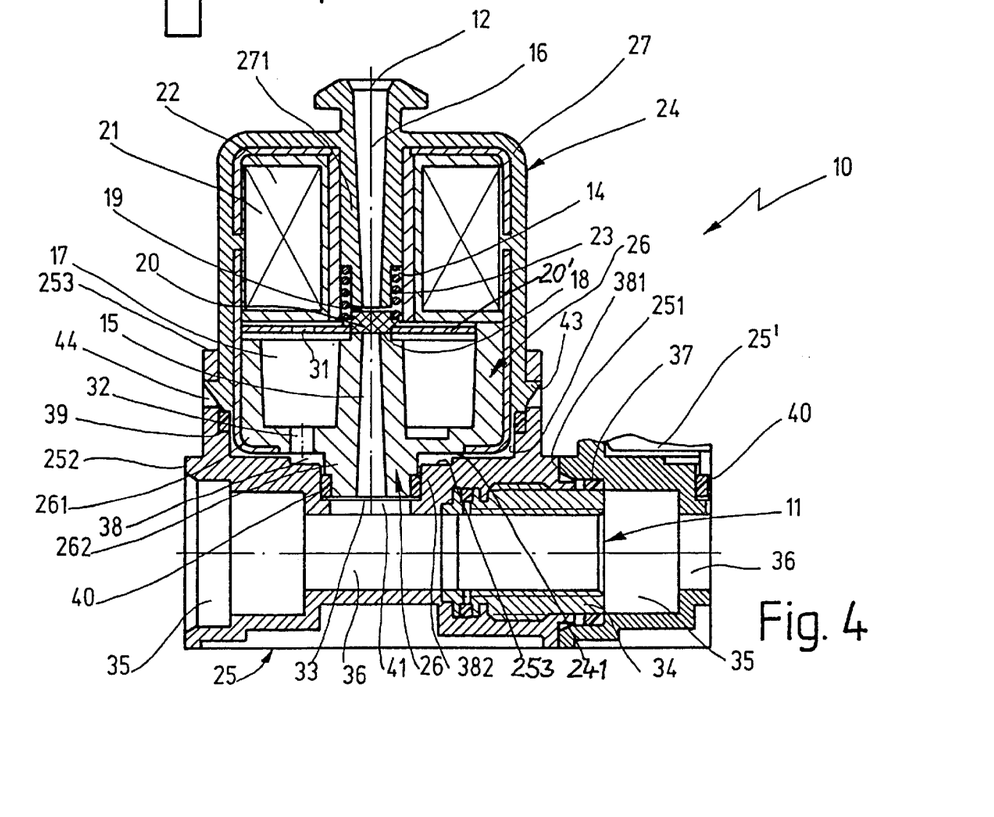
FIG. 4 is a section of the valve along the line IV—IV in FIG. 3.
Figure 5:
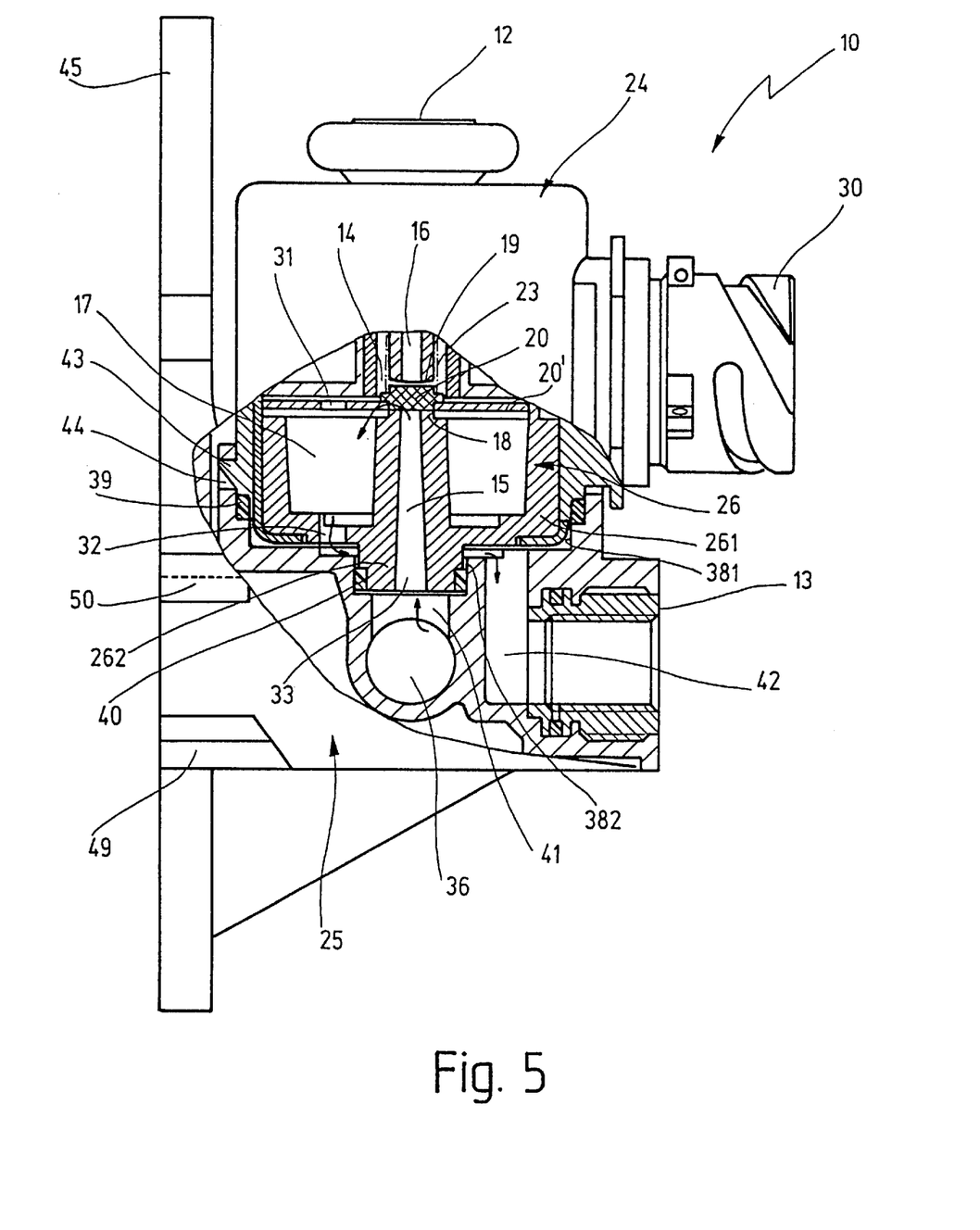
FIG. 5 is a representation of the valve that is similar to FIG. 3, but is enlarged and shown in a partially sectional manner.

The supply conduit 15 and the ventilation conduit 16 are flush with each other and each have a valve seat 18 or 19 on their conduit mouth in the valve chamber 14, against which seats a valve member 20 alternatingly rests. The valve member 20 is fastened to an armature 20' of an electromagnet 21, which armature is embodied as a disk-shaped, stamped sheet metal part, and the magnet coil 22 of this electromagnet 21 is disposed coaxial to the ventilation conduit 16. The valve member 20 is pressed against the valve seat 18 at the supply conduit 15 by a valve spring 23 when the magnet coil 22 is unexcited so that this supply conduit is closed off and the working connection 13 communicates with the vent 12. When the magnet coil 22 is excited, the valve member 20 lifts off from the valve seat 18 and presses against the valve seat 19 on the ventilation conduit 16. As a result, the ventilation conduit 16 is closed off and the working connection 13 communicates with the compressed air network connection 11.

Figure 6:
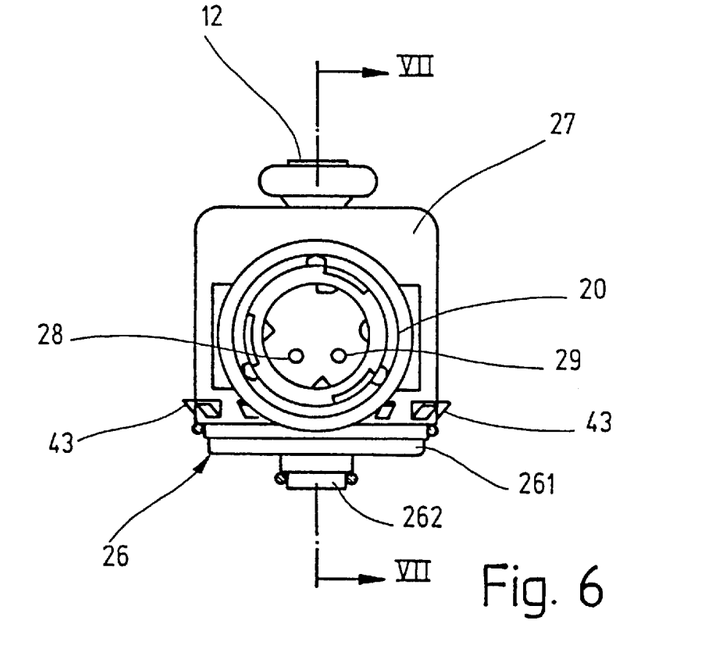
FIG. 6 is a front view of the valve housing of the valve in FIG. 1.
Figure 7:
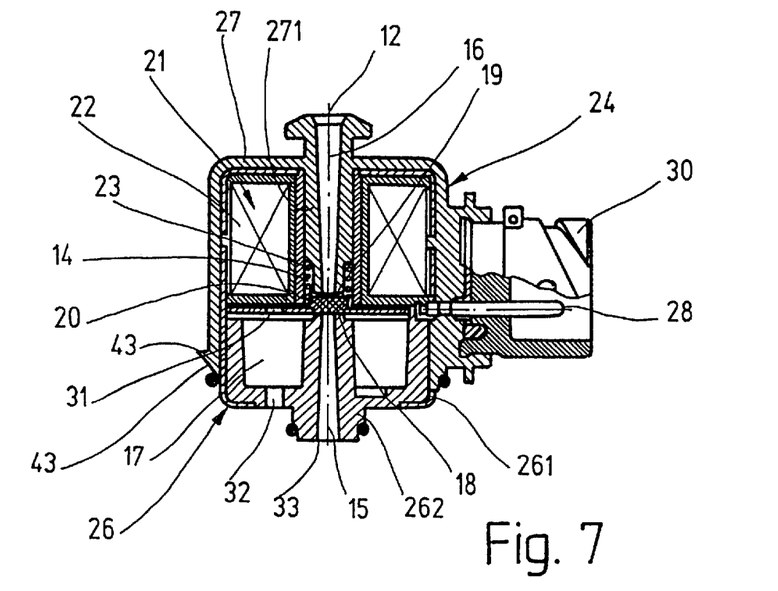
FIG. 7 is a section of the valve housing according to line VII—VII in FIG. 6.
Figure 8:
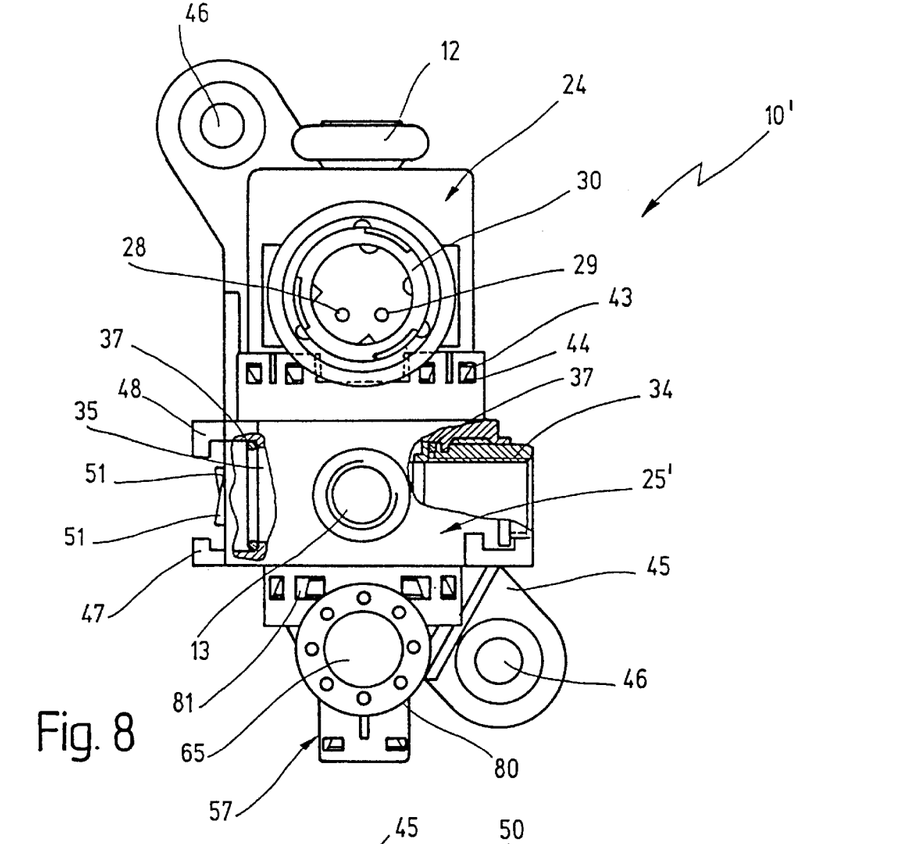
FIG. 8 is a front view of an electromagnetically pilot-controlled pneumatic directional control valve.
Figure 9:
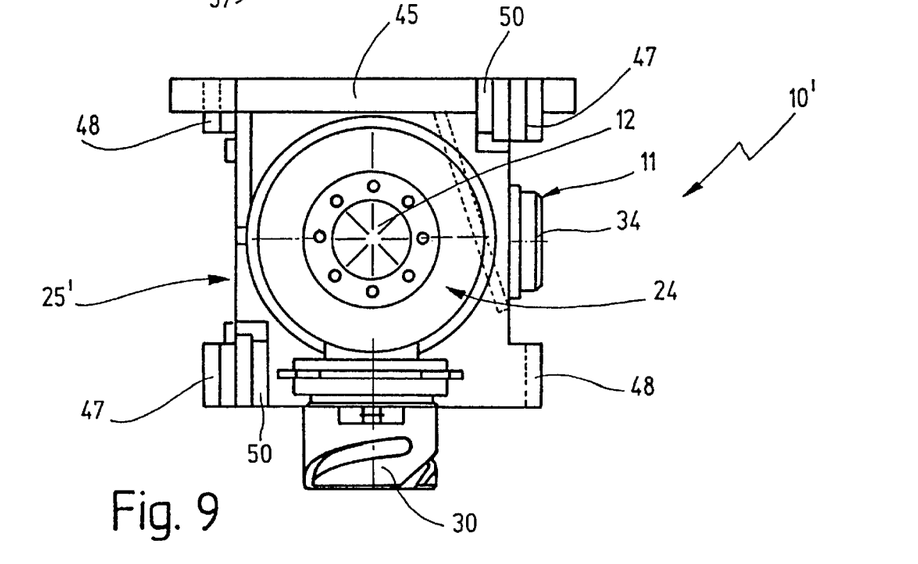
FIG. 9 is a top view of the valve in FIG. 8.
Figure 10:
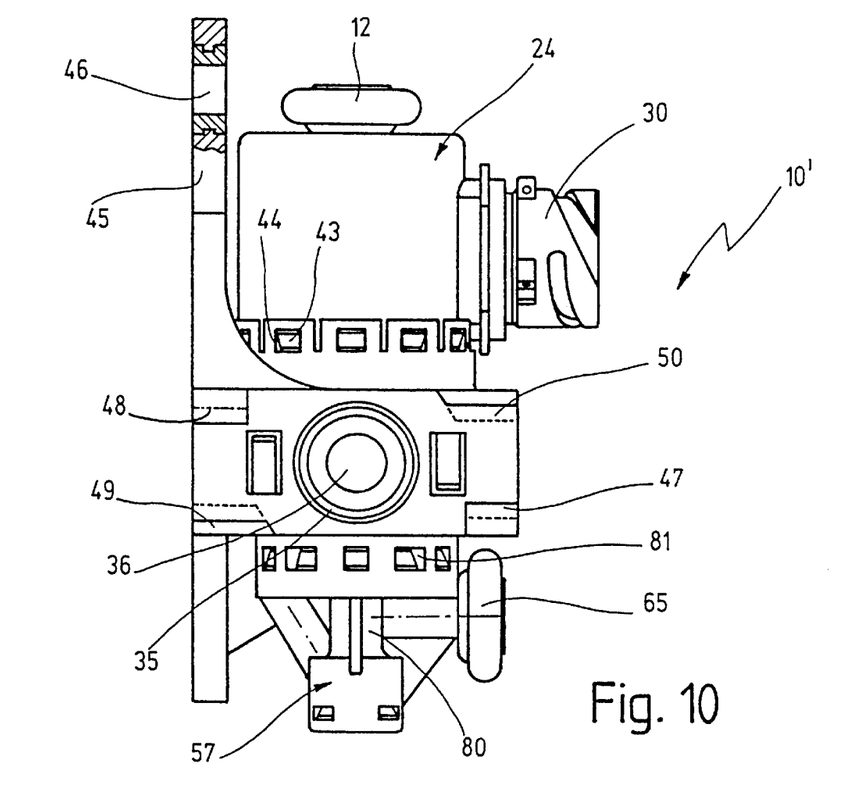
FIG. 10 is a side view of the valve in FIG. 8.
Figure 11:
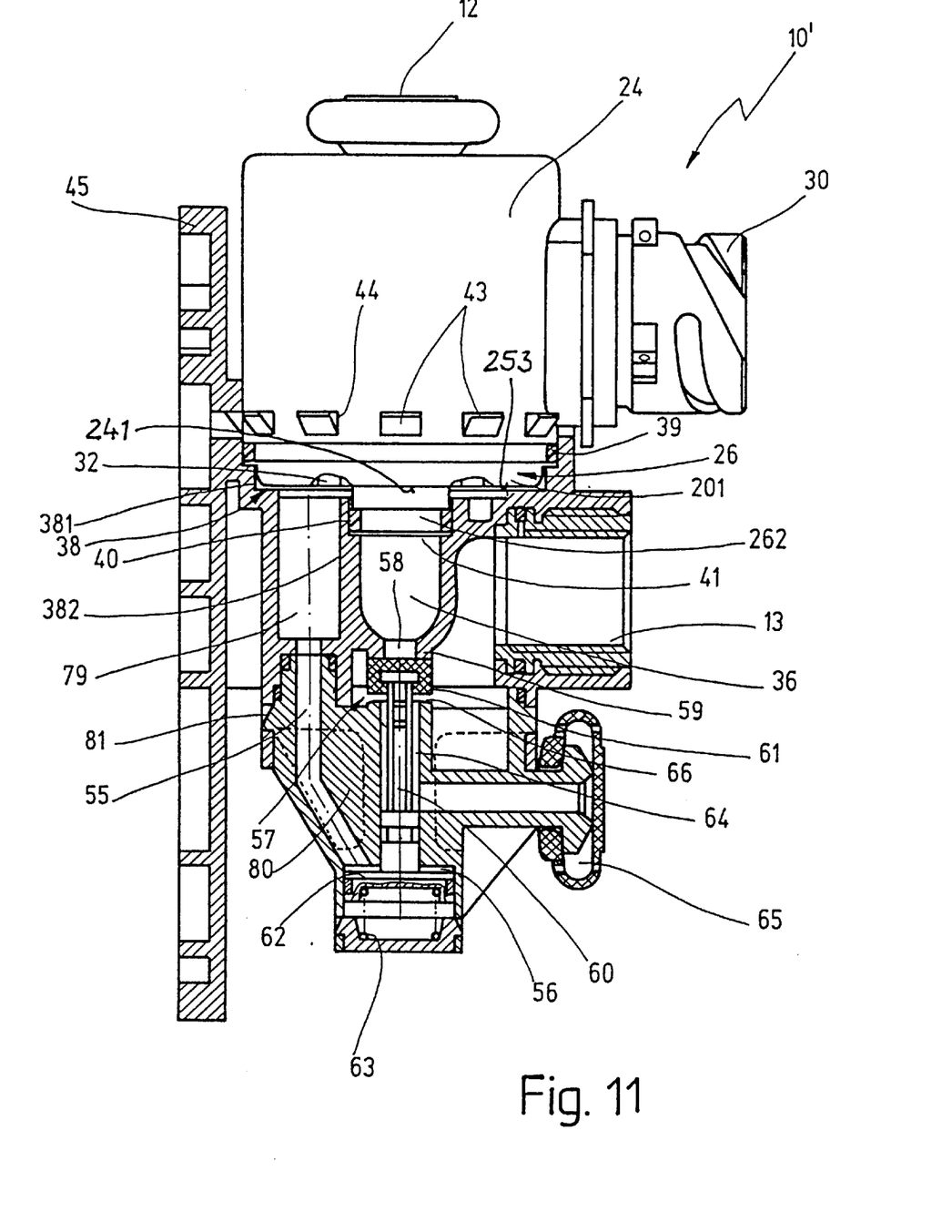
FIG. 11 is a representation similar to the one in FIG. 10, but is enlarged and shown in partially sectional fashion.

In order to realize a modular building-block system for building the directional control valve, the electromagnet 21 is combined with the magnet coil 22, the valve chamber 14 with the valve member 20, the working conduit 17, the supply conduit 15, and the ventilation conduit 16 with the valve seats 18, 19, and the vent 12 in a valve housing 24, while the connections 11, 13 for the compressed air network and the compressed air consuming units are placed into a connecting plate 25 that can be separated from the valve housing 24, which connecting plate is detachably connected to the valve housing 24. In this manner, one obtains a standardized valve housing 24, as shown in FIGS. 6 and 7, which housing can be connected to differently conceived connecting plates 25. Depending on the design of the connecting plate 25, an electromagnetically, directly actuated directional control valve 10 according to FIGS. 1–5 or an electromagnetically pilot-controlled directional control valve 10' according to FIGS. 8–11 can be produced. The valve housing 24 is embodied of two parts and is comprised of a lower housing part embodied as a stepped plug-in fitting 26 and an upper housing part that is embodied as a cap 27 that partially covers the plug-in fitting 26. The cap 27 has a pin-shaped center part 271 in which the ventilation conduit 16 extends coaxially and onto which the magnetic coil 22 is placed. The coil ends of the magnetic coil 22 are guided through the cap 27 and electrically connected to both plug pins 28, 29 of a two-pole plug 30. The plug 30 is secured on the side of cap 27. The plug-in fitting 26 has two fitting sections 261 and 262 with different diameters. In the plug-in fitting 26, the supply conduit 15 is embodied as a coaxial bore and the working conduit 17 is embodied as an annular chamber coaxial to it, which communicates with the valve chamber 14 via an inlet opening 31 in the armature 20' and with an outlet opening 32, feeds into the annular end face of the larger diameter fitting section 261. The mouth 33 of the supply conduit 15 is disposed in the circular end face of the smaller diameter fitting section 262.

In the connecting plate 25 that is detachably connected to the valve housing 24, the compressed air network connection 11 is shown in the sectional representation according to FIG. 4 and the working connection 13 is shown in the sectional representation according to FIG. 5. The compressed air network connection 11 includes a connection fitting 34 that can be accessed on the one plate side 251 of the connecting plate 25 and a connecting bore 35 positioned on the opposite plate side 252 of the connecting plate 25, which bore communicates with the connection fitting 34 via a coaxial connecting conduit 36 (FIG. 4). The connection fitting 34 is realized by a screw sleeve with internal thread, which is formed in a pressure tight manner into the connecting plate 25 comprised of plastic and can be adapted to different thread sizes, thread forms, and sealing systems. The connection fitting 34 and connecting bore 35 are matched to each other so that the connection fitting 34 can be plugged into the connecting bore 35 in an airtight manner, with the interposition of a radially sealing O-ring 37. In order to illustrate this, FIG. 4 shows a detail of the connecting plate 25' of a neighboring directional control valve with a detail of the connecting bore 35 shown. The sectional representation shows how the connection fitting 34 of the connecting plate 25 plugs into the connecting bore 35 of the neighboring connecting plate 25' and how the plug connection is sealed by the O-ring 37.

A stepped plug-in bore 38 is let into the top side 253 of the plug-in plate 25 and has two coaxial bore sections 381 and 382 that have different bore diameters. The bore sections 381 and 382 are adapted to the fitting sections 261 and 262 of the plug-in fitting 26 on the valve housing 24 in order to receive them so that when the plug-in fitting 26 is plugged into the plug-in bore 38, the fitting sections 261 and 262 rest in a sealed fashion in the associated bore section 381 or 382, with the respective interposition of a radially sealing O-ring 39 or 40. The smaller diameter bore section 382 communicates via a coaxial opening 41 with the connecting conduit 36 between the connection fitting 34 and the connecting bore 35 and therefore communicates with the compressed air network connection 11 so that the supply conduit 15—as already mentioned—is disposed on the compressed air network connection 11. As can be seen in FIG. 5, the larger diameter bore section 381 communicates with the working connection 13 via a connecting conduit 42 so that the working conduit 17—as already mentioned —leads to the working connection 13. The working connection 13 is in turn realized by means of a screw sleeve that has an internal thread and is formed into the connecting plate 25. A pressure line leading to a compressed air consuming unit is screwed into the internal thread of the screw sleeve.

For the connection of the valve housing 24 and connecting plate 25, the valve housing 24 has radially protruding detent projections 43 (see FIGS. 1 and 3–7) on its circumference, which snap into corresponding detent openings 44 in the connecting plate 25. As a result of the O-rings 39, 40 inserted between the plug-in fittings 26 of the valve housing 24 and the plug-in bore 38, no tolerance problems are produced when assembling the valve housing 24 and connecting plate 25. The sliding together of the two parts is achieved in an extremely short time. The disassembly is performed by lifting the detent projections 43 out from the detent openings 44 by means of a suitable tool.

For the connection of the directional control valve 10 to the vehicle, a fastening plate 45 is formed onto the connecting plate 25 and of one piece with it, which extends at right angles to the top and bottom of the connecting plate 25 as well as to the two plate sides 251, 252 of the connecting plate 25 that contain the connection fitting 34 or the connecting bore 35. In the fastening plate 45, two diagonally disposed fastening eyes 46, 47 are embodied out of injection molded metal sleeves through which fastening screws can be guided, which are screwed to the vehicle frame or to a suitable carrier plate on the vehicle frame.

Figure 1:
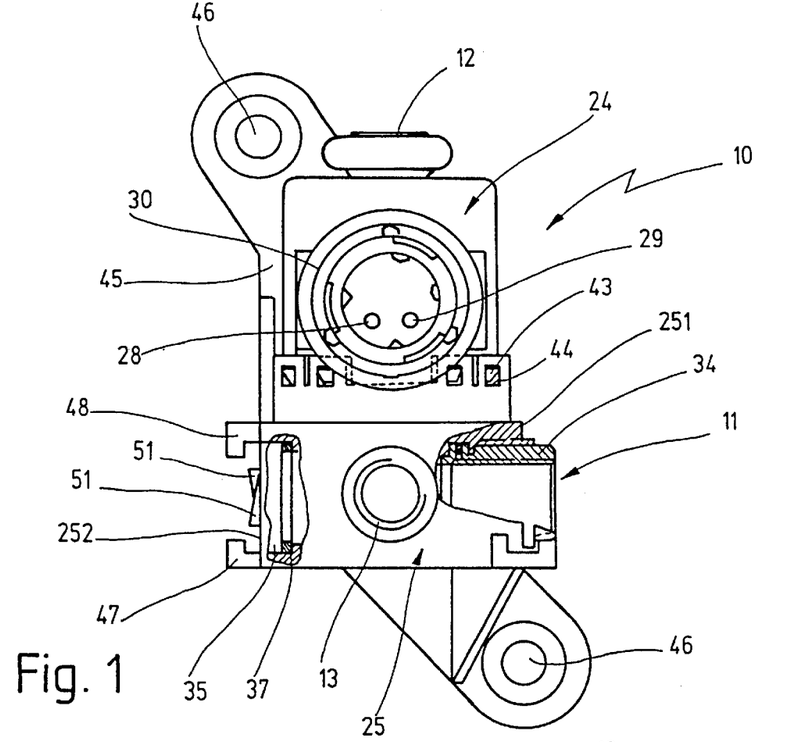
FIG. 1 is a front view of an electromagnetically controlled pneumatic directional control valve.
Figure 2:
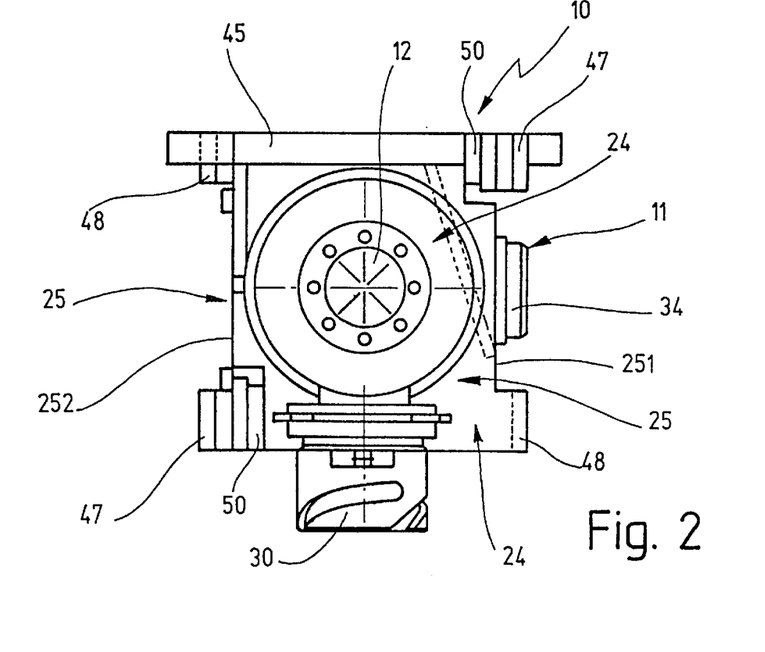
FIG. 2 is a top view of the valve in FIG. 1.
Figure 3:
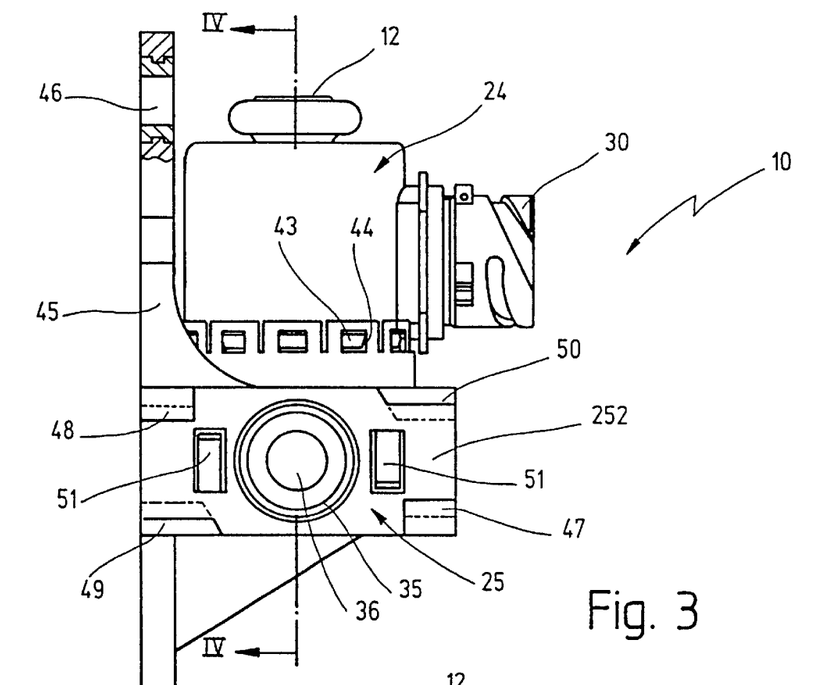
FIG. 3 is a side view of the valve in FIG. 1.
Figures 14, 15:
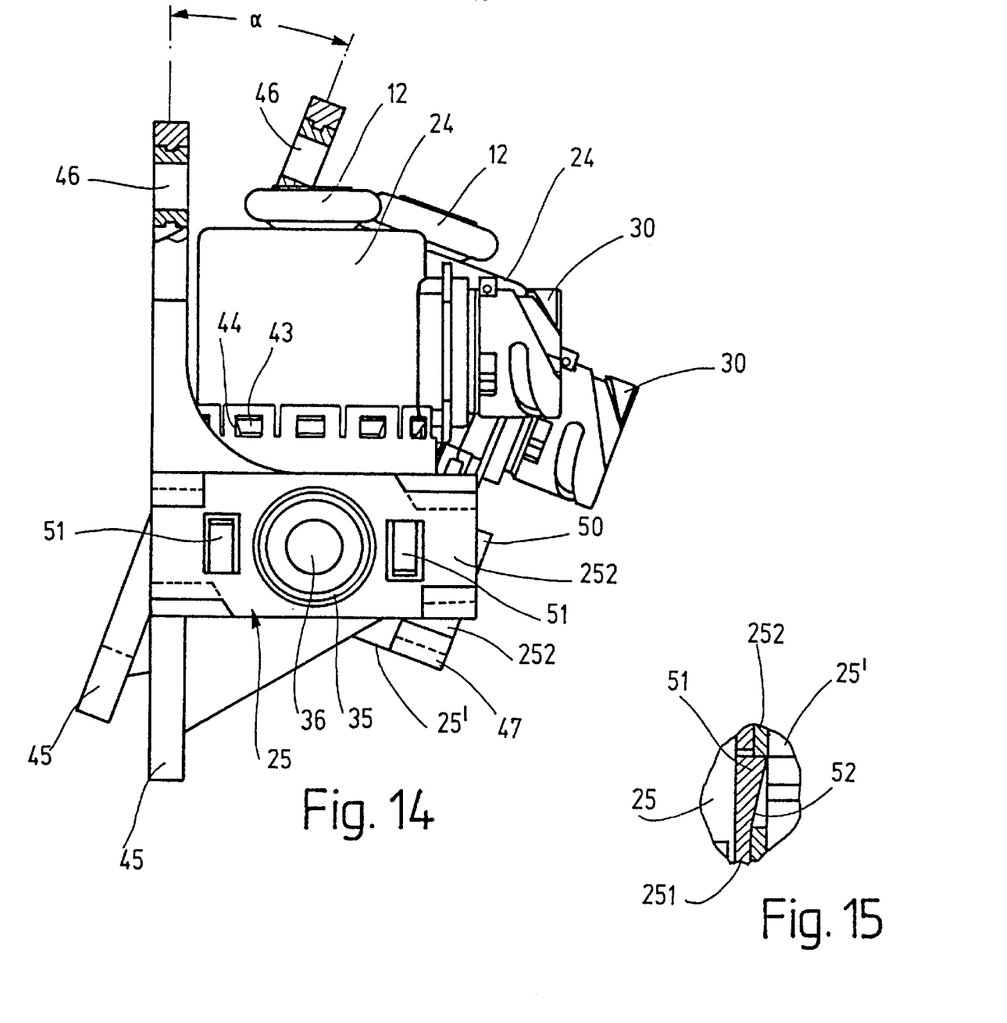
FIG. 14 is a side view of two valves placed against one another before production of a fixed connection in the valve block.
FIG. 15 shows a detail of an enlarged representation of connecting means between two valves combined into a valve block.

As shown in FIGS. 1–3, on the plate sides 251 and 252 which carry the connection fitting 34 or the connecting bore 35 of the compressed air network connection 11, connecting means are disposed that are embodied so that they correspond with one another to produce a mechanical connection between two connecting plates 25, 25' with a connection fitting 34 and a connecting bore 35 that are plugged into one another (FIG. 4). In particular, on each plate side 251 and 252, respectively, these connecting means include two claws 47, 48 and two incorporated pockets 49, 50 that are disposed diagonal to one another on each plate side 251 and 252. FIG. 3 shows both diagonally disposed claws 47, 48 and both diagonally disposed pockets 49, 50 on the plate side 252. The same claws 47, 48 and pockets 49, 50 are disposed on the plate side 251 so that when the plate side 251 of the one connecting plate 25 is placed against the plate side 252 of the other connecting plate 25', the corresponding claws 47, 48 on the plate side 251 of the connecting plate 25 engage in the pockets 49, 50 on the plate side 252 of the other connecting plate 25' and conversely, the claws 47, 48 on the plate side 252 of the connecting plate 25' engage in the pockets 49, 50 in the plate side 251 of the other connecting plate 25' and thus the two connecting plates 25, 25' interlock with each other. As illustrated in FIG. 14, the claws 47, 48 and the pockets 49, 50 are embodied so that for the reciprocal sliding of the claws 47, 48 on the one connecting plate 25 into the pockets 49, 50 on the other connecting plate 25' and vice versa, the two connecting plates 25, 25' must be placed against each other rotated in relation to each other by an angle α, wherein the connection fitting 34 of the one connecting plate 25 fits into the connecting bore 35 of the other connecting plate 25' (FIG. 4). Then the two connecting plates 25, 25' are rotated back around the flush longitudinal axes of the connection fitting 34 and the connecting bore 35 until the angle α has become zero. By means of this rotation, the claws 47, 48 slide into the associated pockets 49, 50 and lock the two connecting plates 25, 25' in the axial direction in relation to each other.

In order to prevent an inadvertent release of the two connecting plates 25, 25' from each other through a renewed rotation of the connecting plates 25, 25' by the angle α in relation to each other, the connecting means also have detent projections 51 and detent openings 52. Two detent projections 51 are disposed on the plate side 252 on opposite sides of the connecting bore 35 of the compressed air network connection 11, wherein they are embodied rotated by 180° in relation to each other. The two detent openings 52 are disposed on the plate side 251 on both sides of the connection fitting 34 of the compressed air network connection 11 so that they correspond to the detent projections 41. When the two connecting plates 25 and 25' that are placed against each other according to FIG. 14 are rotated in the direction of reducing the rotational angle α, at the end of the rotation (α=0), the detent projections 51 on the plate side 252 of the connecting plate 25 engage in the detent openings 52 on the plate side 251 of the connecting plate 25', as is illustrated in FIG. 15. As a result, the two connecting plates 25 and 25' are secured against turning back and the connection between the two connecting plates 25, 25' cannot be inadvertently released. A lifting of the detent connection and therefore a rotation of the two connecting plates 25, 25' in relation to each other is only possible after pressing the detent projections 51 out of the detent openings 52, which can be achieved by means of a flat object.

Figure 18:
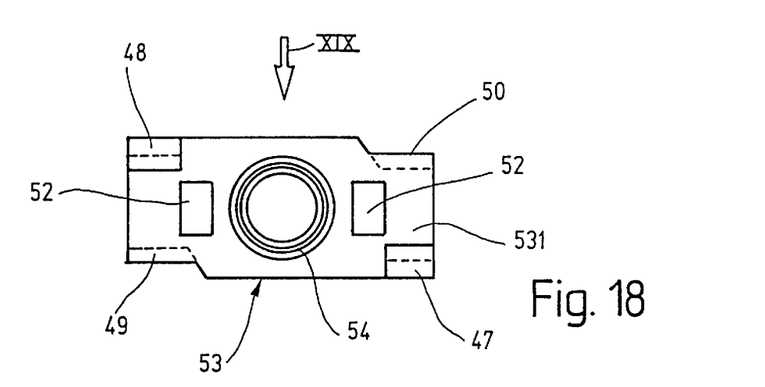
FIG. 18 is a front view of a closing element.
Figure 19:
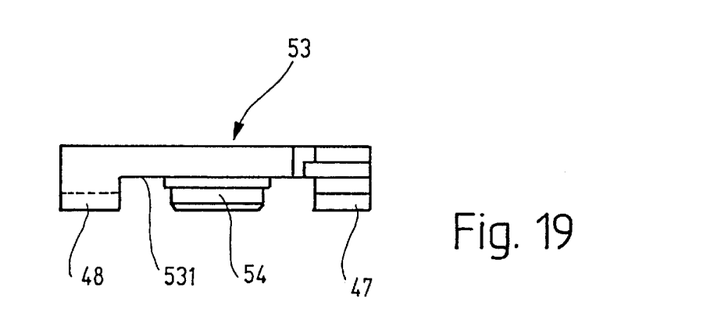
FIG. 19 is a view of the closing element according to arrow XIX in FIG. 18.

The modular building-block system of the directional control valve described also includes a closing element 53, as depicted in FIGS. 18 and 19. This closing element 53 is used to close the connecting bore 35 of the compressed air network connection 11 and for this purpose, has a pin 54 that corresponds to the connecting bore 35 and dips into the connecting bore 35 in an airtight manner with the interposition of a radially sealing O-ring. The same connecting means are disposed on the side 531 of the closing element 53 that has the pin 54, like on the plate side 251 of the connecting plate 25 on which the connection fitting 34 projects. These connecting means in turn include the two diagonally disposed claws 47, 48 and the two diagonally disposed pockets 49, 50, as well as two detent openings 52. As illustrated in FIG. 14, for placing the two connecting plates 25, 25' against each other, the closing element 53 must also be placed against the plate side 252 of the connecting plate 25 at the same rotational angle α. Through the subsequent turning of the connecting element 53 back in the direction of reducing the rotation angle α until α=0, the claws 47, 48 of the closing element 53 pivot into the pockets 49, 50 on the connecting plate 25 and conversely, the claws 47, 48 pivot into the pockets 49, 50 on the closing element 53. At the end of the rotational movement, the detent projections 51 embodied on the plate side 252 of the connecting plate 25 engage in the two detent openings 52 in the closing element 53. If the pressure supply line coming from the compressed air network is now connected to the connection fitting 34 and the pressure line leading to the compressed air consuming unit is now connected to the working connection 13, and the electromagnet 21 is electrically contacted via the two-pole plug 30, as shown in FIGS. 1–5, then the 3/2-way solenoid valve 10 is fully functional.

Figure 13:
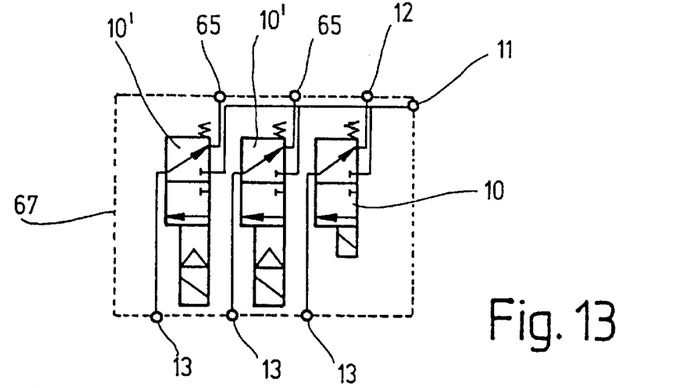
FIG. 13 is a circuit diagram of the valve block in FIG. 12.

FIGS. 8–11 show a pneumatic 3/2-way solenoid valve 10' with electromagnetic pilot control. The circuit symbol of this pilot-controlled valve 10' is shown in FIG. 13. To realize this pilot-controlled valve with the modular building-block system, another connecting plate 25' is provided and is only modified on the inside in order to accommodate a pneumatically controlled main valve. The deliberate connection of the housing 24 to the connecting plate 25 realizes an electromagnetically, directly actuated 3/2-way valve 10 and the connection of the housing 24 to the connecting plate 25' realizes an electromagnetically pilot-controlled, pneumatically actuated 3/2-way valve 10'. Like the connecting plate 25 in FIGS. 1–5, in an unaltered way, the connecting plate 25' has the compressed air network connection 11 with the connection fitting 34 and connecting bore 35, which communicate with each other by means of the connecting conduit 36, has the working connection 13, as well as the connecting means comprised of claws 47, 48, pockets 49, 50, detent projections 51, and detent openings 52. The stepped plug-in bore 38 is also embodied identically, which with its two bore sections 381 and 382, receives the two fitting sections 261 and 262 of the plug-in fitting 26 on the valve housing 24 in an airtight manner, wherein in turn, the smaller diameter bore section 382 is connected to the connecting conduit 36 between the connection fitting 24 and the connecting bore 35 of the compressed air network connection 11. In a modification in relation to the connecting plate 25, the larger diameter bore section 381 is not directly connected to the working connection 13, but rather to a connecting conduit 79, which is connected via a control conduit 55 to a work chamber 56 of a pneumatically actuated seat valve 57. The seat valve 57 has a valve opening 58, which produces a connection between the connecting conduit 36 and the working connection 13. The valve opening 58 is encompassed by a valve seat 59 upon which a valve plate 61 fastened to a valve tappet 60 rests. On the end remote from the valve plate 61, the valve tappet 60 is connected to a sliding piston 62 which defines the work chamber 56 on one end. If an air pressure is built up in the work chamber 56, then the sliding piston 62 slides counter to the restoring force of a valve closing spring 63, the valve plate 61 lifts up from the valve seat 59, and the connecting conduit 36 is connected to the working connection 13 so that this connection is disposed on the compressed air network. When the seat valve 57 is closed, the working connection 13 is connected to a separate vent 65 via a ventilation conduit 64. At the same time, the ventilation conduit 65 is connected to the guide conduit for the valve tappet 60. On its free end face remote from the valve plate 61, the ventilation conduit 64 is provided with a valve seat 66, upon which the valve plate 61 rests when the seat valve 57 opens and this valve plate 61 closes the vent 65 off from the working connection 13. The vent 12 in the valve housing 24 is used to ventilate the work chamber 56 of the seat valve 57. The seat valve 57, along with the work chamber 56, sliding piston 62, valve closing spring 63, valve tappet 60, and valve plate 61 as well as the control conduit 55 and the ventilation conduit 64 with the valve seat 66 are integrated into a valve body 80 which rests against the bottom of the connecting plate 25' and is connected to it by means of a detent connection 81 comprised of detent projections and detent openings. The valve seat 59 of the seat valve 57, which seat encompasses the valve opening 58 between the connecting conduit 36 and the working connection 13 is embodied in the connecting plate 25'.

Figure 12:
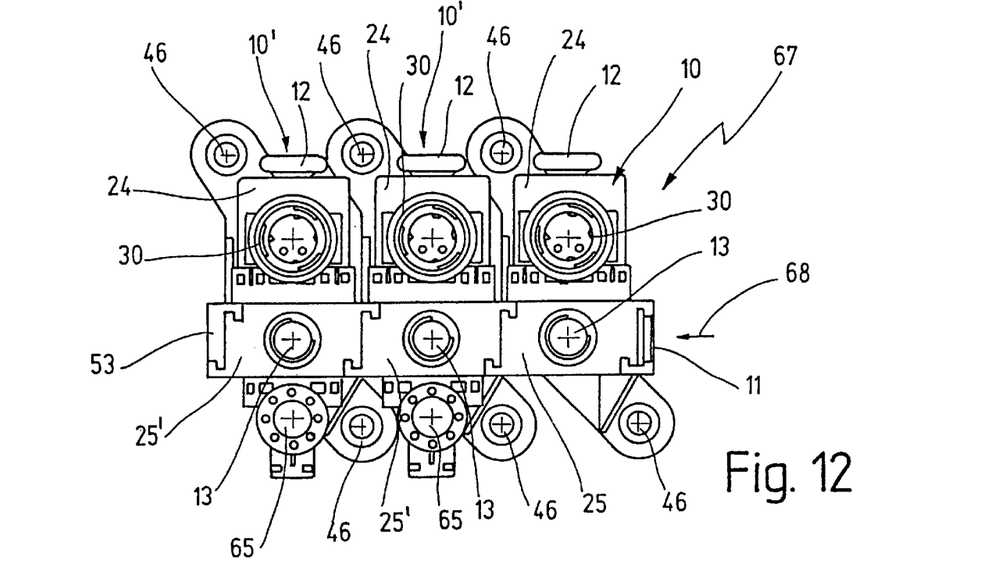
FIG. 12 is a front view of a valve block comprised of three valves.
Figure 16:
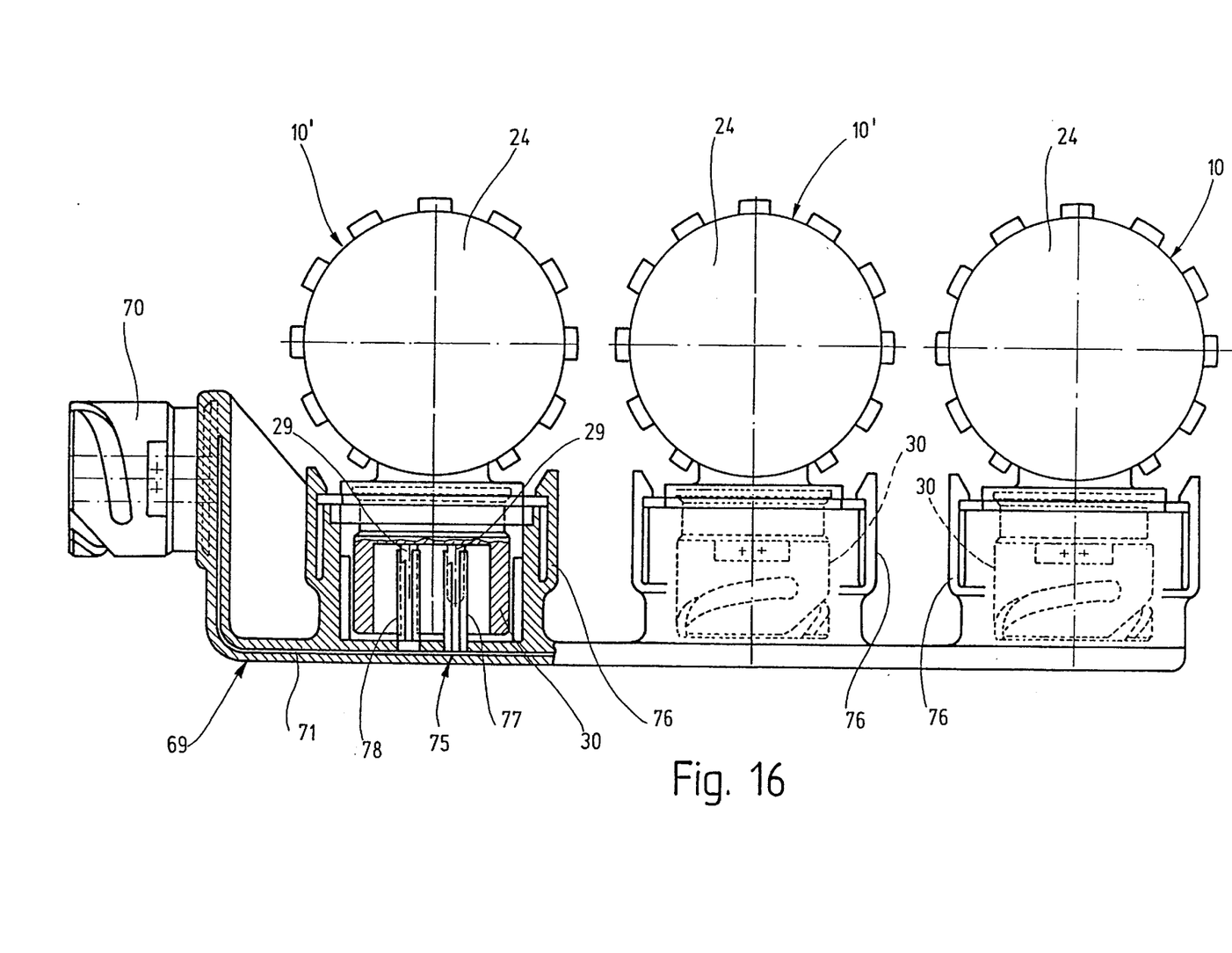
FIG. 16 is a side view of a bus for electrically contacting the valve block in FIG. 12, in a partially sectional view.
Figure 17:
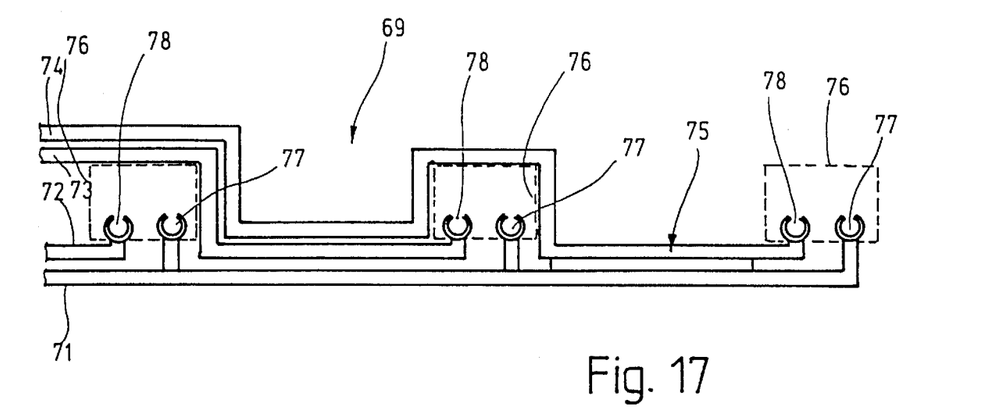
FIG. 17 is a schematic representation of a top view of a stamped grating of the bus in FIG. 16.

By way of example, FIG. 12 shows how three of the valves described can be combined into a valve block 67. Two of these valves are pilot-controlled 3/2-way solenoid valves 10' and one valve is a directly controlled 3/2-way solenoid valve 10. The two valves 10' correspond in valve structure to FIGS. 8–11 and the valve 10 corresponds in valve structure to FIGS. 1–5. FIG. 13 shows the circuit diagram of the valve block 67. The individual connecting plates 25, 25' and 25' of the three valves 10, 10', and 10' are described above and are placed against one another in the manner illustrated in FIG. 14. The connecting bore 35 of the compressed air network connection 11 in the connecting plate 25' of the latter valve 10' (on the left in FIG. 12) is closed by the closing element 53 according to FIGS. 18 and 19. The pressure supply line of the compressed air network is screwed into the connection fitting 34 of the compressed air network connection 11 in the connecting plate 25 of the first valve 10. The flow direction of the compressed air is indicated in FIG. 12 with an arrow 68. The valve block 67 can be attached to the individual connecting plates 25, 25', and 25' on the vehicle via the six fastening eyes 46. A bus 69 with three plug caps 76 and a connecting plug 70, which is shown in a partially sectional side view in FIG. 16, is for contacting the three plugs 30 of the valve block 67. The connecting plug 70 according to DIN 72 585 has four electrical contacts which are each connected to a strip conductor 71 –74 (FIG. 17) of the bus 69. The strip conductors 71–74 are realized by means of a stamped grating 75, which is extrusion coated with plastic. Two plug sleeves 77, 78 are disposed in each plug cap 76 so that they slide onto the two plug pins 28, 29 of the plug 30 when the plug cap 76 is placed onto a plug 30 on the housing 24. All of the plug sleeves 77 connected to the strip conductor 71 and are of one piece with it, while the plug sleeves 78 of the first, second, and third plug sleeve 76 are connected to and of one piece with the strip conductor 72, the strip conductor 73, and the strip conductor 74 (FIG. 17). By sliding the bus 69 with its plug caps 76 onto the plugs 30 on the valve block 67, all of the electromagnets of the three valves are electrically connected in a correct fashion.

The foregoing relates to preferred exemplary embodiments of the invention, it being understood that other variants and embodiments thereof are possible within the spirit and scope of the invention, the latter being defined by the appended claims.

I claim:

1. An electromagnetically actuatable pneumatic directional control valve (10; 10) comprising a compressed air network connection (11), a vent (12) and at least one working connection (13) for a compressed air consuming unit, a valve member (20) that is actuated by an electromagnet (21) and, for an alternating closure of a working conduit (17) that leads to a working connection (13) in relation to the compressed air network connection (11) and the vent (12), is alternatingly placed against one of two valve seats (18, 19) of which the one valve seat is embodied at the conduit mouth of a supply conduit (15) that leads to the compressed air network connection (11) and another valve seat is embodied at the conduit mouth of a ventilation conduit (16) that leads to the vent (12), the electromagnet (21), the valve member (20), the working conduit (17), the supply conduit (15), and the ventilation conduit (16), along with corresponding valve seats (18, 19) and the vent (12) are combined in a valve housing (24) and the connections (11, 13) for the compressed air network and the compressed air consuming units are disposed in a connecting plate (25; 25) that can be separated from the valve housing (24) and is detachably connected to the valve housing (24), that the compressed air network connection (11) has a connection fitting (34) that is accessible on one plate side (251) of the connecting plate (25; 25), and has a connecting bore (35) that is let into the remote plate side (252) of the connecting plate (25; 25), which fitting and bore communicate with each other and are adapted to each other so that the connection fitting (34) can be plugged into the connecting bore (35) of a second directional control valve (10; 10) in an airtight manner with the interposition of a radially sealing O-ring (37), and that connecting means are disposed on each of the plate sides (251, 252) of the connecting plate (25; 25) that carry the connection fitting (34) or the connecting bore (35), which connecting means are embodied so that the connecting means correspond to each other to produce a connection between the two connecting plates (25, 25) of the two directional control valves (10, 10), with the connection fitting (34) and the connecting bore (35) plugged into each other.

2. A valve according to claim 1, in which a stepped plug-in fitting (26) with two coaxial fitting sections (261, 262) of different diameters is embodied on the bottom (241) of the valve housing (24) and a stepped plug-in bore (38) with two coaxial bore sections (381, 382) of different diameters is embodied on the top (253) of the connecting plates (25; 25), that the plug-in fitting (26) can be plugged into the plug-in bore (38) in a sealed fashion with the interposition of a radially sealing O-ring (39, 40) between each fitting section (261, 262) and the associated bore section (381, 382), that the supply conduit (15) feeds into a circular end face of the smaller diameter fitting section (262) and the working conduit (17) feeds into an annular end face of the larger diameter fitting section (262), and that the smaller diameter bore section (382) of the plug-in bore (38) communicates with a connecting conduit (36) which joins the connection fitting (34) and the connecting bore (35) of the compressed air network connection (11) to each other.

3. A valve according to claim 2, in which the larger diameter bore section (381) of the plug-in bore (38) communicates with the working connection (13).

4. A valve according to claim 2, in which in the connecting conduit (36) between the connection fitting (34) and the connecting bore (35) of the compressed air network connection (11), a valve opening (58) is provided that is sealed by a valve plate (61) of a seat valve (57) and communicates with the working connection (13), that the valve plate (61) is attached via a valve tappet (60) which is attached to a sliding piston (62) that defines a work chamber (56), and that the larger diameter bore section (381) of the plug-in bore (38) communicates with the work chamber (56).

5. A valve according to claim 4, in which the seat valve (57) is integrated into a valve body (80) connected to the connecting plate (25), in which valve body a vent (65) and a ventilation conduit (64) connecting the vent (65) to the working connection (13) are embodied, a ventilation conduit feeds freely, with spacing from the valve opening (58), and that at the conduit mouth, a valve seat (66) is embodied, against which the valve plate (61) rests with the unblocking of the valve opening (58).

6. A valve according to claim 1, in which the connecting bore (35) of the compressed air network connection (11) in the connecting plate (25; 25) can be closed by means of a closing element (53) that has a connecting means on one side of the element, which correspond to the connecting means disposed on the plate side (252) of the connecting plate (25; 25) that contains the connecting bore (35) to produce a connection, and that the closing element (53) has a pin (54) that protrudes into the connecting bore (35) when the closing element (53) is placed against the connecting plate (24), and seals it in an airtight fashion by means of a sealing ring (37).

7. A valve according to claim 1, in which the housing (24) and the connecting plate (25; 25) can be connected to each other in detent fashion and for this purpose, detent openings (44) and detent projections (43) that can snap into them are provided, wherein the detent projections (43) are preferably disposed on the circumference of the valve housing (24) and the detent openings (44) are disposed on the connecting plate (25; 25).

8. A valve according to claim 1, in which fastening means for spatially fixing the connecting plate (25; 25) are provided on a plate side of the connecting plate (25; 25) that extends at right angles to the two plate sides (251, 252) that carry the connection fitting (34) and the connecting bore (35), respectively.

9. A valve according to claim 8, in which the fastening means include a fastening plate (45) formed onto the connecting plate (25; 25) and preferably of one piece with it that has two fastening eyes (46) preferably disposed diagonally on it.

10. A valve according to claim 1, in which the connecting means provided on the remote plate sides (251, 252) of the connecting plate (25; 25) include two protruding claws (47, 48) and two incorporated pockets (49, 50), wherein the pockets (49, 50) are embodied for receiving the claws (47, 48), that the two claws (47, 48) and the two pockets (49, 50) on each plate side (251, 252) are disposed diagonal to each other on both plate sides (251, 252) so that after the connection fitting (34) of the one directional control valve (10) is plugged into the connecting bore (35) of another directional control valve (10), the respective claws (47, 48) of the one connecting plate (25 or 25) engage behind the pockets (49, 50) of the other connecting plate (25 or 25).

11. A valve according to claim 10, in which the claws (47, 48) and pockets (49, 50) are embodied so that they are disposed in one another with positive engagement in the axial direction after the two connecting plates (25, 25), which are placed against each other rotated in relation to each other around the longitudinal axes of the connection fitting (34) and the connecting bore (35), are rotated back again.

12. A valve according to claim 1, in which the connecting means have detent projections (51) embodied on one plate side (252) and detent openings (52) embodied on the other plate side (251) and that the detent openings (52) and detent projections (51) are associated with one another so that after the connection fitting (34) and the connecting bore (35) of the connecting plates (25, 25) of two directional control valves (10, 10) are plugged into each other and after the connecting plates (25, 25) are rotated to produce the positive engagement between the claws (47, 48) and pockets (49, 50), the detent projections (51) engage in the associated detent openings (52) and secure the two connecting plates (25; 25) against rotation around the longitudinal axes of the connection fitting (34) and the connecting bore (35).

13. A valve according to claim 1, in which winding ends of a magnet coil (22) of the electromagnet (21) are routed to a two-pole plug (30) that is disposed on the valve housing (24), and can be accessed from the outside, and has two plug pins (28, 29).

14. A valve according to claim 13, in which the plug (30) is covered by a plug cap (76) that has two plug-in sleeves (77, 78) that can be slid onto the plug pins (28, 29), that a number of plug caps (76) are connected to an electric bus (69) that has a number of strip conductors (71–74) realized by means of a stamped grating (75), wherein one plug sleeve (77) of a plug cap (76) is connected to a strip conductor (71) shared by all of the plug caps (76) and one plug sleeve (78) is respectively connected to a different strip conductor (72–74), and that at the other and, all of the strip conductors (71–74) are connected to electrical contacts of an electrical connecting plug (70).

* * * * *